United States Patent
Goslen et al.

(10) Patent No.: US 11,874,731 B2
(45) Date of Patent: Jan. 16, 2024

(54) PREDICTING AND MITIGATING MEMORY LEAKAGE IN A COMPUTER SYSTEM

(71) Applicant: Hewlett Packard Enterprise Development LP, Houston, TX (US)

(72) Inventors: Gregory B. Goslen, Plano, TX (US); Christopher S. Murray, Boynton Beach, FL (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 37 days.

(21) Appl. No.: 17/513,663

(22) Filed: Oct. 28, 2021

(65) Prior Publication Data
US 2023/0134485 A1    May 4, 2023

(51) Int. Cl.
*G06F 11/07*    (2006.01)
*G06F 3/06*     (2006.01)

(52) U.S. Cl.
CPC .......... *G06F 11/0793* (2013.01); *G06F 3/065* (2013.01); *G06F 3/0619* (2013.01); *G06F 3/0673* (2013.01); *G06F 11/073* (2013.01); *G06F 11/0751* (2013.01)

(58) Field of Classification Search
CPC ............... G06F 11/0793; G06F 11/073; G06F 11/0751; G06F 3/0619; G06F 3/065; G06F 3/0673
See application file for complete search history.

(56) References Cited

U.S. PATENT DOCUMENTS

| | | | |
|---|---|---|---|
| 2006/0080364 A1* | 4/2006 | Lake | G06F 11/3409 |
| 2010/0262954 A1* | 10/2010 | Roos | G06F 11/36 711/170 |
| 2013/0211762 A1 | 8/2013 | Taskov | |
| 2016/0070633 A1* | 3/2016 | Abraham | G06F 9/5016 714/47.3 |
| 2017/0308449 A1* | 10/2017 | Mangione-Tran | G06F 11/0778 |
| 2017/0344297 A1* | 11/2017 | Woolman | G06F 3/0685 |
| 2019/0370009 A1* | 12/2019 | Venkatraman | G06F 3/0616 |
| 2020/0327040 A1 | 10/2020 | Booth et al. | |
| 2021/0009056 A1 | 1/2021 | Mangione-Tran | |

* cited by examiner

*Primary Examiner* — Jigar P Patel
(74) *Attorney, Agent, or Firm* — Trop, Pruner & Hu, P.C.

(57) ABSTRACT

The system determines a first and a second snapshot of memory usage by processes in a computing system based on a predetermined time interval, wherein a respective snapshot indicates, for a respective process, memory usage corresponding to memory types including private memory and shared memory. The system computes, for processes common to the first and the second snapshots, a likelihood of memory leak for a process and memory type based on: an increase in an amount of heap memory and private memory; an increase in an amount of shared memory; and an increase in a total amount of private and shared memory. The system compares the computed likelihood for the process with a predetermined threshold. Responsive to determining that the computed likelihood for the process exceeds the predetermined threshold, the system performs a corrective action to address memory leak associated with the process.

20 Claims, 12 Drawing Sheets

|  | PRIVATE MEMORY 202 | SHARED MEMORY 204 |
|---|---|---|
| ANONYMOUS (NON-FILE-BACKED) MEMORY 212 | malloc()<br>mmap(PRIVATE, ANON) | POSIX shm_open()<br>mmap(SHARED, ANON) |
| FILE-BACKED MEMORY 214 | mmap(PRIVATE, fd) | mmap(SHARED, fd) |

FIG. 2

```
Example of Steps 1 through 8 of the method's comparative accounting output.

The older memory usage snapshot is called "File 1".
The recent memory usage snapshot is called "File 2".

Step 1.   302,908 KiB:   Total Memory Usage for File 1 ("total_file_1")
Step 1.   315,992 KiB:   Total Memory Usage for File 2 ("total_file_2")
Step 1.    13,084 KiB:   Difference between File 2 Memory Usage and File 1 Memory Usage Step 2.         0 KiB:   Memory Usage (Private + Shared) in File 1 that is not in File 2 ("memory_file_1_only")
Step 3.         0 KiB:   Memory Usage (Private + Shared) in File 2 that is not in File 1 ("memory_file_2_only")

Step 4.    16,684 KiB:   Increase in Private memory usage between File 1 and File 2 ("private_increase")
Step 5.       902 KiB:   Increase in Shared memory usage between File 2 and File 1 ("shared_increase")

Step 7.   315,992 KiB:   New Total Memory Usage for File 1 (excluding tmpfs changes)
Step 7.   315,992 KiB:   Old Total Memory Usage for File 2 (unchanged from Step 1)
Step 8.         0 KiB:   Difference between File 2 Memory Usage and New File 1 Memory Usage Step 8 provides a "sanity check" on the comparative accounting algorithm.
It verifies that the changes in memory between Snapshot 1 ("File 1") and Snapshot 2 ("File 2")
have been completely accounted for, with no errors.
```

FIG. 5A

Example of Step 11: Total (Private + Shared) Memory Usage Increases
for processes in both File 1 and File 2

| 522 | process name | PssShared | Heap | Private | Shared | Total Used | Total Used % |
|---|---|---|---|---|---|---|---|
| Step 11. | httpd | 0.0 | 7780.0 | 13060.0 | 8.0 | 13068.0 | 86.29% |
| Step 11. | python3.5 | 0.0 | 116.0 | 864.0 | 291.0 | 1155.0 | 4.39% |
| Step 11. | restv1.fcgi | 0.0 | 54.0 | 1584.0 | -430.0 | 1154.0 | 23.13% |
| Step 11. | canopen | 0.0 | 56.0 | 632.0 | -29.0 | 603.0 | 13.72% |
| Step 11. | x11vnc | 226.0 | 32.0 | 32.0 | 226.0 | 258.0 | 2.32% |
| Step 11. | Xorg | 226.0 | 0.0 | -12.0 | 231.0 | 219.0 | 1.80% |
| Step 11. | em_events | 0.0 | 28.0 | 152.0 | 0.0 | 152.0 | 5.25% |
| Step 11. | awk | 0.0 | 124.0 | 124.0 | 0.0 | 124.0 | 5.64% |
| Step 11. | wsevents.py | 0.0 | 28.0 | 80.0 | 0.0 | 80.0 | 0.81% |
| Step 11. | cluster_sync_daemon | 0.0 | 40.0 | 60.0 | 0.0 | 60.0 | 1.91% |
| Step 11. | matchbox-panel | 0.0 | 0.0 | 8.0 | 23.0 | 31.0 | 0.57% |
| Step 11. | cluster_consist | 0.0 | 28.0 | 28.0 | 0.0 | 28.0 | 0.51% |
| Step 11. | attrd | 22.0 | 0.0 | -8.0 | 29.0 | 21.0 | 1.07% |
| Step 11. | rsyslogd | 0.0 | 0.0 | 16.0 | 0.0 | 16.0 | 0.73% |
| Step 11. | bcm.user | 0.0 | 0.0 | 12.0 | 0.0 | 12.0 | 0.05% |
| Step 11. | crmd | 16.0 | 0.0 | -4.0 | 15.0 | 11.0 | 0.10% |
| Step 11. | cib | 9.0 | 0.0 | -16.0 | 26.0 | 10.0 | 0.11% |
| Step 11. | g8032 | 0.0 | 0.0 | 4.0 | 1.0 | 5.0 | 0.52% |
| Step 11. | lldp | 0.0 | 0.0 | 4.0 | 0.0 | 4.0 | 0.22% |
| Step 11. | fp_netlink | 0.0 | 0.0 | 0.0 | 1.0 | 1.0 | 0.19% |

FIG. 5B

Example of Step 13a: Computing Criterion for Total Used Private + Shared Memory

Total (Private + Shared) Memory Usage Growth Criterion for processes in both File 1 and File 2

----- Memory growth over entire CHO run -----

| | process name | PssShared | Heap | Private | Shared | Criterion | Health |
|---|---|---|---|---|---|---|---|
| 542 | | | | | | | |
| Step 13a. | httpd | 0.0 | 7780.0 | 13060.0 | 8.0 | 1.61 | CRITICAL |
| Step 13a. | python3.5 | 0.0 | 116.0 | 864.0 | 291.0 | 19.35 | OK |
| Step 13a. | em_events | 0.0 | 28.0 | 152.0 | 0.0 | 65.95 | OK |
| Step 13a. | awk | 0.0 | 124.0 | 124.0 | 0.0 | 113.32 | OK |
| Step 13a. | cluster_sync_daemon | 0.0 | 40.0 | 60.0 | 0.0 | 127.43 | OK |
| Step 13a. | cib | 9.0 | 0.0 | -16.0 | 26.0 | 177.47 | OK |
| Step 13a. | wsevents.py | 0.0 | 28.0 | 80.0 | 0.0 | 186.53 | OK |
| Step 13a. | cluster_consist | 0.0 | 28.0 | 28.0 | 0.0 | 244.79 | OK |
| Step 13a. | attrd | 22.0 | 0.0 | -8.0 | 29.0 | 367.98 | OK |
| Step 13a. | rsyslogd | 0.0 | 0.0 | 16.0 | 0.0 | 414.50 | OK |
| Step 13a. | x11vnc | 226.0 | 32.0 | 32.0 | 226.0 | 459.43 | OK |
| Step 13a. | crmd | 16.0 | 0.0 | -4.0 | 15.0 | 467.49 | OK |
| Step 13a. | Xorg | 226.0 | 0.0 | -12.0 | 231.0 | 468.89 | OK |
| Step 13a. | bcm.user | 0.0 | 0.0 | 12.0 | 0.0 | 509.23 | OK |
| Step 13a. | lldp | 0.0 | 0.0 | 4.0 | 0.0 | 719.55 | OK |
| Step 13a. | g8032 | 0.0 | 0.0 | 4.0 | 1.0 | 832.49 | OK |
| Step 13a. | fp_netlink | 0.0 | 0.0 | 0.0 | 1.0 | 3384.64 | OK |
| Step 13a. | matchbox-panel | 0.0 | 0.0 | 8.0 | 23.0 | 4042.60 | OK |

FIG. 5C

PREDICTING AND MITIGATING MEMORY LEAKAGE IN A COMPUTER SYSTEM

BACKGROUND

Field

This disclosure is generally related to the field of data management. More specifically, this disclosure is related to a method and system for predicting and mitigating memory leakage in a computer system.

BRIEF DESCRIPTION OF THE FIGURES

FIG. 2 illustrates a table depicting various types of memory used by a process, in accordance with an aspect of the present application.

FIG. 5A presents results of Steps 1-8 of the described method, in accordance with an aspect of the present application.

FIG. 5B presents results of Step 11 of the described method, including a list of processes with an increase in total memory usage, in accordance with an aspect of the present application.

FIG. 5C presents results of Step 13 of the described method, including a list of processes with an increase in total memory usage and a computed criterion and health status, in accordance with an aspect of the present application.

In the figures, like reference numerals refer to the same figure elements.

DETAILED DESCRIPTION

Figure 1:
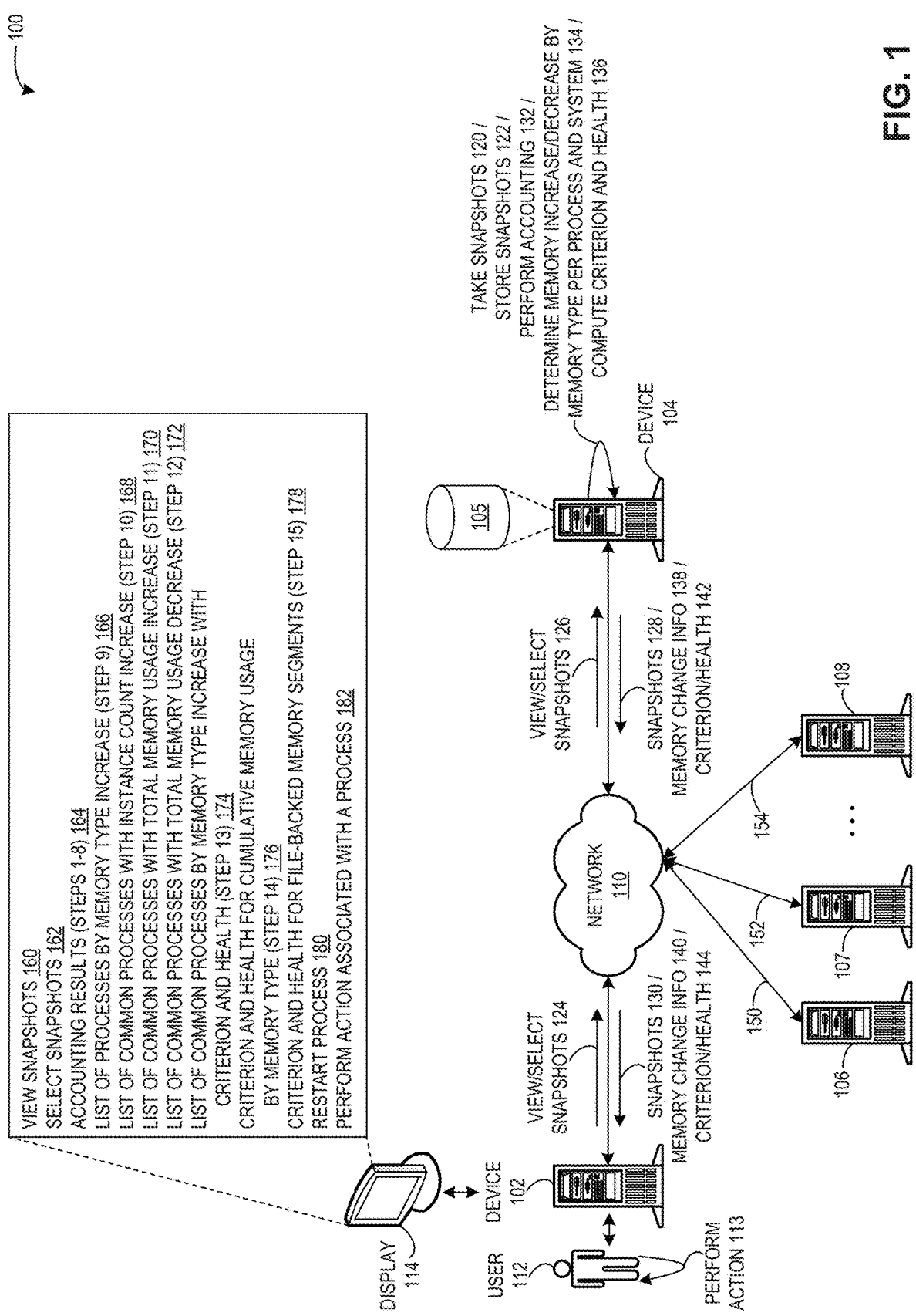
FIG. 1 illustrates an environment with entities and communications which facilitate predicting and mitigating memory leakage in a computer system, in accordance with an aspect of the present application.

The following description is presented to enable any person skilled in the art to make and use the aspects and examples, and is provided in the context of a particular application and its requirements. Various modifications to the disclosed aspects will be readily apparent to those skilled in the art, and the general principles defined herein may be applied to other aspects and applications without departing from the spirit and scope of the present disclosure. Thus, the aspects described herein are not limited to the aspects shown, but are to be accorded the widest scope consistent with the principles and features disclosed herein.

A computing system can include multiple processes running concurrently. Each process may consume memory of the computing system. If the memory usage of a particular process grows beyond a certain threshold (e.g., out of bounds), the system may need to end and restart the process in order to avoid a full reboot of the system. While many computing systems may operate in a redundant manner (e.g., using an active device and a standby device), it may be desirable to avoid moving from the active device to the standby device in order to handle a significant memory leak by a process (or processes).

The described aspects of the present application provide a system which can monitor the usage of memory by the overall system and by individual processes, and can predict whether an observed memory growth may result in a potential memory leak. The system can subsequently perform a corrective action to address an identified memory leak.

The described system can use a memory usage snapshot tool, which can determine snapshots of memory usage by processes in a computing system based on a predetermined and configurable time interval, such as every 30 minutes, every hour, every 2 hours, etc. The system or a user can configure or change the time interval in real time. The term "user" in this disclosure can refer to an administrator, an administrative user, or other user who is authorized to access memory snapshots, receive notification of memory leaks, and perform corrective actions. If memory usage begins to grow more rapidly over time, the system or user can reduce the interval between snapshots in order to allow the system to catch these "faster leaks" before impacting operation of the overall system. The system can also move between two different snapshots by using a sliding window or a jumping window, where each window may include configurable parameters to tune behavior in accordance with system characteristics.

Each snapshot can indicate information for a set of processes running at a respective time. For example, a first snapshot can indicate memory usage corresponding to various types of memory for a given process as well as memory usage by various segments of random access memory (RAM) disk memory. Two types of general memory can include process memory and files in RAM-based file systems (e.g., tmpfs of Linux). The system can treat process memory and RAM disk memory as separate memory spaces even though both types may reside in the physical RAM memory. RAM disk memory (i.e., file-backed memory) can be subdivided into separate spaces of various fixed sizes which are configurable. Each of these spaces can store files of a particular type, e.g., log files, temporary files, and configuration files.

Each process can use two basic types of memory: private memory; and shared memory, as described below in relation to FIG. 2. Private memory can include heap memory and memory-mapped file input/output (I/O). Shared memory can include shared libraries and shared memory, which is memory shared between multiple processes.

The described aspects of the system can include various steps, which are based on the obtained and stored memory snapshots, as described below in relation to FIGS. 1 and 3 and Steps 1-15 of FIGS. 4A-C. The system can display certain results to a user, including results based on an increase or decrease in memory usage based on a memory type for a process, a set of processes, a system, or other grouping of data. An example of displayed results is described below in relation to FIGS. 5A-C. Based on the stored or displayed information, the system can also compute a criterion which indicates a likelihood of a memory leak for a given process and/or memory type usage by the given process. This criterion can be based on a predetermined number of units of time, and can be computed using a least squares linear fit based on the increase in the amount of each type of memory used by a process or the system. The system can define a set of ranges to indicate a health condition or severity level, and can trigger a notification if the health condition or severity level (based on a given computed criterion) falls within a certain range (e.g., by comparing the computed criterion to the predefined ranges or a predetermined threshold). As described herein, these ranges may be predefined or configured by a user or set to a default value. The system can send the notification to the user, e.g., as an alert. The notification may result in the system or the user performing a corrective action to address memory leak associated with a particular process, e.g., killing and restarting a process, or notifying/reporting the issue.

Communications which Facilitate Predicting and Mitigating Memory Leakage

FIG. 1 illustrates an environment 100 with entities and communications which facilitate predicting and mitigating memory leakage in a computer system, in accordance with an aspect of the present application. Environment 100 can include: a device 102, an associated user 112, and an associated display screen 114; a device 104 and an associated or included storage device 105; and devices 106, 107, and 108. User 112 can be an administrative user, network administrator, or other user authorized to perform the operations associated with a user described herein. Devices 102, 104, and 106-108 can communicate with each other via a network 110. Device 102 can be a client computing device, e.g., a laptop computer, a mobile telephone, a smartphone, a tablet, a desktop computer, and a handheld device. Devices 102, 104, and 106-108 can be a computing device (e.g., a server, a networked entity, and a communication device) and can include multiple processes which are running at any given time. Devices 106-108 may provide redundancy for each other, e.g., device 106 may be configured as an active device, and device 107 may be configured as the associated standby device.

During operation, device 104 can take or obtain snapshots of memory usage for processes running in devices 106, 107, and 108 (operation 120), via, e.g., communications 150, 152, and 154, by using a memory usage snapshot tool or other similar functionality. Device 104 can obtain these snapshots at predetermined time intervals which can be set by the system or configured by user 112 or another administrative user. The time intervals can also be set to a default value or dynamically changed while the processes are running, and device 104 can take or obtain a real-time memory snapshot. Device 104 can store the snapshots (operation 122), e.g., in storage device 105. In some aspects, devices 106, 107, and 108 can be independent devices which store their own memory snapshots and make their own decisions based on data in those snapshots.

Display 114 can include, indicate, or display various information to user 112, including actionable widgets and selectable lists or elements 160-182 which can be activated or acted upon to send a command to device 104. That is, user 112 can perform an action 113 to activate any of the elements indicated in display 114. For example, user 112 may wish to view memory snapshots for device 106 (element 160). User 112 may also specify to view snapshots from within a certain time period from device 106 (using elements 160 and 162 and other selectable elements not shown). User 112 may also select certain snapshots for viewing, e.g., a pair of snapshots for memory usage of processes in a certain device and taken at a certain time. User 112 can cause device 102 to send, via the activated elements on display 114, a view/select snapshots 124 command to device 104.

Device 104 can receive command 124 (as a view/select snapshots 126 command), and can return in response requested snapshots 128. Device 102 can receive snapshots 128 (as snapshots 130), and can display the requested snapshots on display 114. As part of responding to command 124/126 to select and return snapshots, device 104 can also perform a comparative accounting (operation 132) for two snapshots which are taken at different times (corresponding to Steps 1-8 of the method described herein), which can cause to be displayed on display 114 account results (Steps 1-8) (element 164). Based on the stored/selected snapshots, device 104 can determine a memory increase/decrease by memory type for each process and for the system (operation 134). Device 104 can return memory change information 138 to device 102. Device 102 can receive memory change information 138 (as memory change information 140), and can display on display 114: a list of processes by memory type increase (corresponding to Step 9) (element 166); a list of common processes (between a pair of snapshots) with an increase in the instance count (corresponding to Step 10) (element 168); a list of common processes with an increase in the total memory usage (corresponding to Step 11) (element 170); and a list of common processes with a decrease in the total memory usage (corresponding to Step 12) (element 172).

Device 104 can also compute a criterion and a health condition (e.g., a severity level) for each process listed in elements 166-172, and can send criterion/health 142 information back to device 102. Device 102 can receive criterion/health 142 (as criterion/health 144), and can display on display 114 a list of common processes with an increase in memory usage by memory type with the criterion and health (corresponding to Step 13) (element 174). Display 114 can also include a list of common process with a decrease in memory usage by memory type with the criterion and health (not shown), as well as the criterion and health for cumulative memory usage by memory type for each data point in every process (corresponding to Step 14) (element 176). In addition, display 114 can include the criterion and health for file-backed memory segments (corresponding to Step 15) (element 178). Steps 1-15 are described below in relation to FIGS. 4A-C, with some example displayed results described below in relation to FIGS. 5A-C (similar to display elements 164-178).

Upon viewing or obtaining the criterion and health, the system or user 112 can determine to perform a corrective action to address memory leak associated with a given process running on device 106, e.g., by sending a restart process command for a given process via element 180 or by performing an action associated with the given process via element 182. By identifying, killing, and restarting the given process which is detected as a memory leak in device 106, the system can both efficiently handle the detected memory leak for the given process and avoid switching from active device 106 to standby device 107, which can result in an improvement in the performance and efficiency of the overall system.

Memory Types

FIG. 2 illustrates a table 200 depicting various types of memory used by a process, in accordance with an aspect of the present application. Table 200 indicates four quadrants, and can include private memory 202 and shared memory 204, with each memory type associated with either an anonymous (non-file-backed) memory 212 or a file-backed memory 214. Each memory page of a process may have only one of the four classifications in the quadrants of table 200 at a time. Each quadrant can indicate examples of system calls which can result in the creation of memory corresponding to that quadrant.

For example: a malloc( ) call can result in the creation of private anonymous (non-file-backed) memory, e.g., heap memory; an mmap (PRIVATE, ANON) call can result in the creation of private memory which is also anonymous (non-file-backed and no name or file descriptor is attached); and an mmap (PRIVATE, fd) call can result in the creation of private memory which is filed-backed, with a file descriptor, such as memory-mapped file input/output (I/O). If the system allocates memory on the heap (e.g., by using malloc( )), both the heap and the private memory will increase. If the system allocates memory by using mmap( ), the heap usage stays the same and the private memory increases.

As another example: a POSIX shm_open( ) call can result in the creation of a shared memory object, which opens shared memory but may not save to a file; an mmap (SHARED, ANON) call can result in the creation of shared memory which is anonymous (non-file-backed); and an mmap (SHARED, fd) call can result in the creation of shared memory which is filed-backed, with a file descriptor.

The term "private memory" refers to memory which can be allocated based on the above-described calls, and can include heap memory. As described above, an increase in heap memory can result in an increase in private memory, because heap memory usage may be included in the usage of private memory. However, an increase in private memory does not result in an increase in the usage of heap memory. The term "shared memory" refers to memory which can be allocated based on the above-described calls, and can include memory shared by two or more processes. The term "proportional set size" (PSS) shared memory refers to a proportional amount of memory used by a given process as compared to total memory usage. The shared PSS memory for a process which is using part of, e.g., 100K of shared memory, can increase if no other process or program is using part of the 100K of shared memory. As other processes or programs begin to use the shared memory, the shared memory usage may increase while the shared PSS memory usage may decrease.

Methods which Facilitate Predicting and Mitigating Memory Leakage

Figure 3:
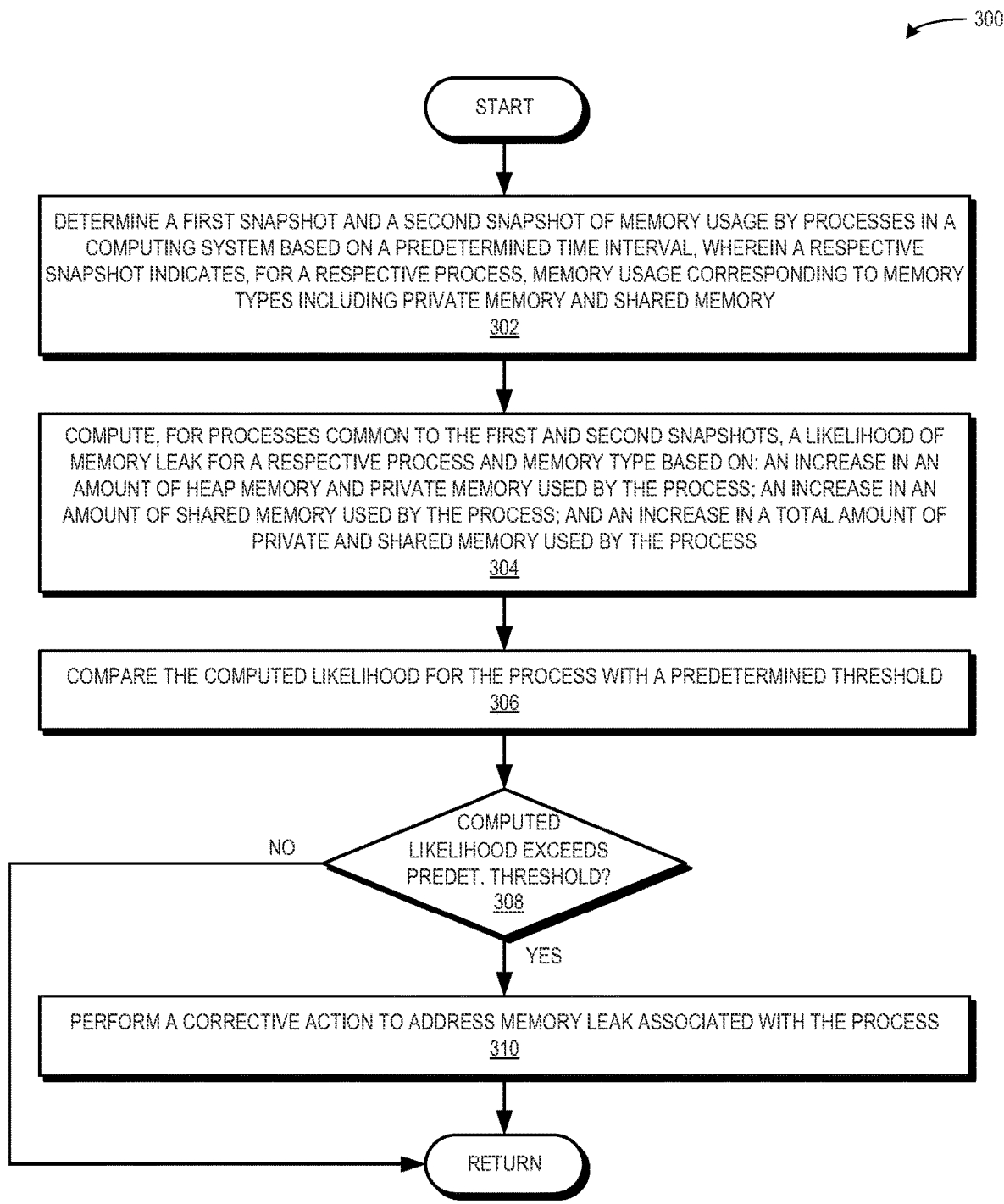
FIG. 3 presents a flowchart illustrating a method which facilitates predicting and mitigating memory leakage in a computer system, in accordance with an aspect of the present application.

FIG. 3 presents a flowchart 300 illustrating a method which facilitates predicting and mitigating memory leakage in a computer system, in accordance with an aspect of the present application. During operation, the system determines a first snapshot and a second snapshot of memory usage by processes in a computing system based on a predetermined time interval, wherein a respective snapshot indicates, for a respective process, memory usage corresponding to memory types including private memory and shared memory (operation 302). The system computes, for processes common to the first and the second snapshots, a likelihood of memory leak for a respective process and memory type based on: an increase in an amount of heap memory and private memory used by the process; an increase in an amount of shared memory used by the process; and an increase in a total amount of private and shared memory used by the process (operation 304). The system compares the computed likelihood for the process with a predetermined threshold (operation 306). If the computed likelihood for the process exceeds the predetermined threshold (decision 308), the system performs a corrective action to address memory leak associated with the process (operation 310). If the computed likelihood for the process does not exceed the predetermined threshold (decision 308), the operation returns.

Figure 4A:
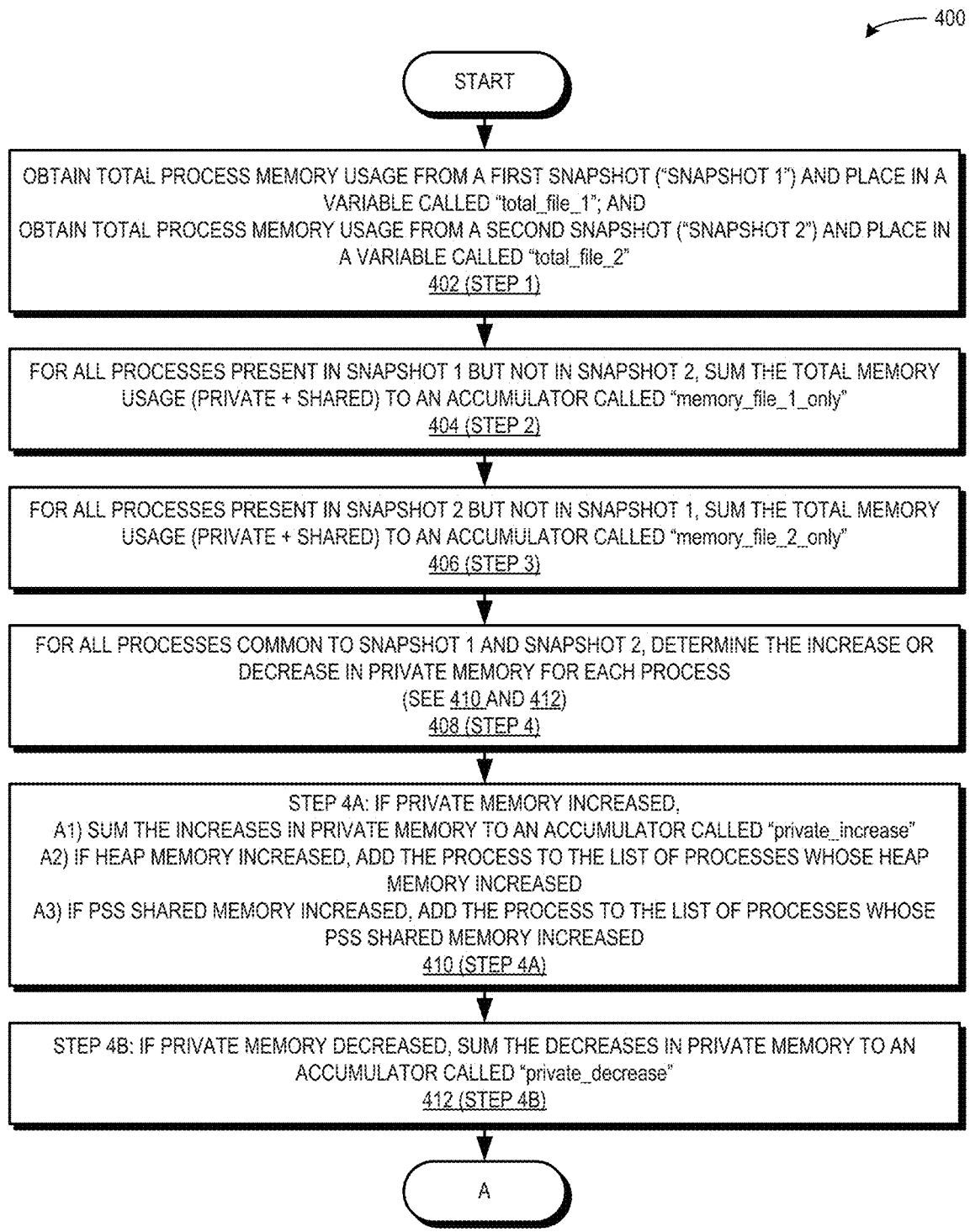
FIG. 4A presents a flowchart illustrating a method which facilitates predicting and mitigating memory leakage in a computer system, including Steps 1-4 as described herein, in accordance with an aspect of the present application.

FIG. 4A presents a flowchart 400 illustrating a method which facilitates predicting and mitigating memory leakage in a computer system, including Steps 1-4 as described herein, in accordance with an aspect of the present application. During operation, the system obtains the total process memory usage from a first snapshot ("snapshot 1") and places it in a variable called "total_file_1," and obtains the total process memory usage from a second snapshot ("snapshot 2") and places it in a variable called "total_file_2" (Step 1, operation 402). For all processes present in snapshot 1 but not in snapshot 2, the system sums the total memory usage (private+shared) to an accumulator called "memory_file_1_only" (Step 2, operation 404). For all processes present in snapshot 2 but not in snapshot 1, the system sums the total memory usage (private+shared) to an accumulator called "memory_file_2_only" (Step 3, operation 406). For all processes common to snapshot 1 and snapshot 2, the system determines the increase or decrease in private memory for each process (Step 4, operation 408). Step 4 can include Step 4A, operation 410 and Step 4B, operation 412. If the amount of private memory usage has increased, the system performs the following operations: the system sums the increases in private memory to an accumulator called "private_increase" (Step 4A1); if the heap memory increased for a process, the system adds the process to the list of processes whose heap memory increased (Step 4A2); and if the PSS shared memory increased for a process, the system adds the process to the list of processes who PSS shared memory increased (Step 4A3) (Step 4A, operation 410). If the private memory decreased, the system sums the decreases in private memory to an accumulator called "private_decrease" (Step 4B, operation 412), and the operation continues at Label A of FIG. 4B.

Figure 4B:
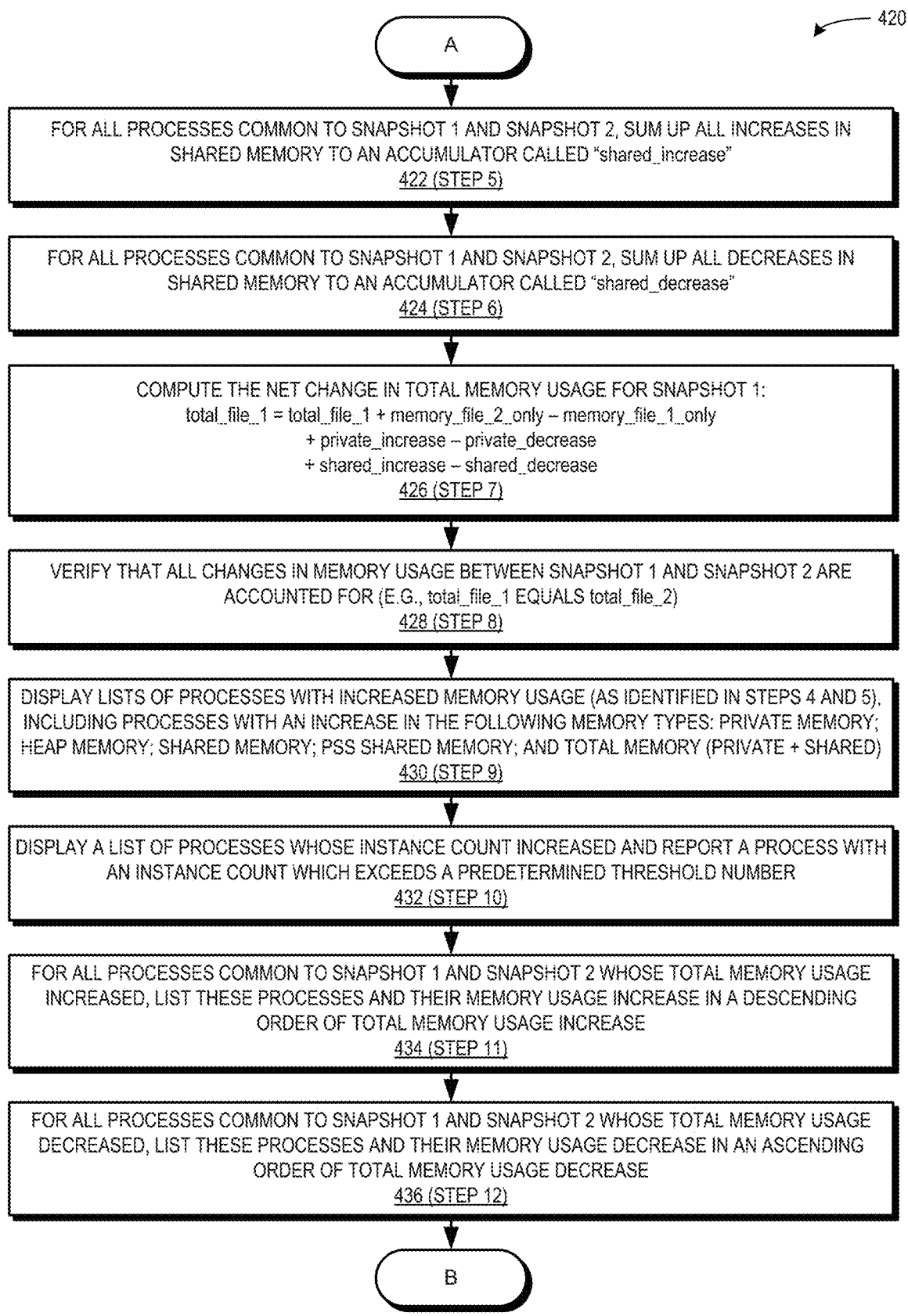
FIG. 4B presents a flowchart illustrating a method which facilitates predicting and mitigating memory leakage in a computer system, including Steps 5-12 as described herein, in accordance with an aspect of the present application.

FIG. 4B presents a flowchart 420 illustrating a method which facilitates predicting and mitigating memory leakage in a computer system, including Steps 5-12 as described herein, in accordance with an aspect of the present application. For all processes common to snapshot 1 and snapshot 2, the system sums up all increases in shared memory to an accumulator called "shared_increase" (Step 5, operation 422). For all processes common to snapshot 1 and snapshot 2, the system sums up all decreases in shared memory to an accumulator called "shared_decrease (Step 6, operation 424). Subsequently, the system computes the net change in total memory usage for snapshot 1, e.g.: total_file_1=total_file_1+ memory_file_2_only−memory_file_1_only+private_increase−private_decrease+shared_increase−shared_decrease (Step 7, operation 426). The system verifies that all changes in memory usage between snapshot 1 and snapshot 2 are accounted for (e.g., that total_file_1 is equal to total_file_2) (Step 8, operation 428). If the changes are not accounted for, i.e., the system determines a discrepancy between the newly calculated net change for total_file_1 and total_file_2, the system can generate a notification for a user, and the user can take a corrective action to identify or address the reason for the discrepancy (not shown). An example of information displayed as a result of Steps 1-8 is described below in relation to FIG. 5A.

The system displays lists of processes with increased memory usage (as identified in Step 4, operation 408 and Step 5, operation 422), including processes with an increase in the following memory types: private memory; heap memory; shared memory; shared PSS memory; and total memory (private+shared) (Step 9, operation 430). An example of a displayed list with increased memory usage for common processes to two snapshots is described below in relation to FIG. 5B. The system also displays a list of processes whose instance count has increased and can report a process with an instance count which exceeds a predetermined threshold or number (Step 10, operation 432). For all processes common to snapshot 1 and snapshot 2 whose total memory usage increased, the system lists these processes and their memory usage increase in a descending order of total memory usage increase (Step 11, operation 434), as depicted in FIG. 5B. For all processes common to snapshot 1 and snapshot 2 whose total memory usage decreased, the system lists these processes and their memory usage decrease in an ascending order of total memory usage decrease (Step 12, operation 436). The operation continues at Label B of FIG. 4C.

Figure 4C:
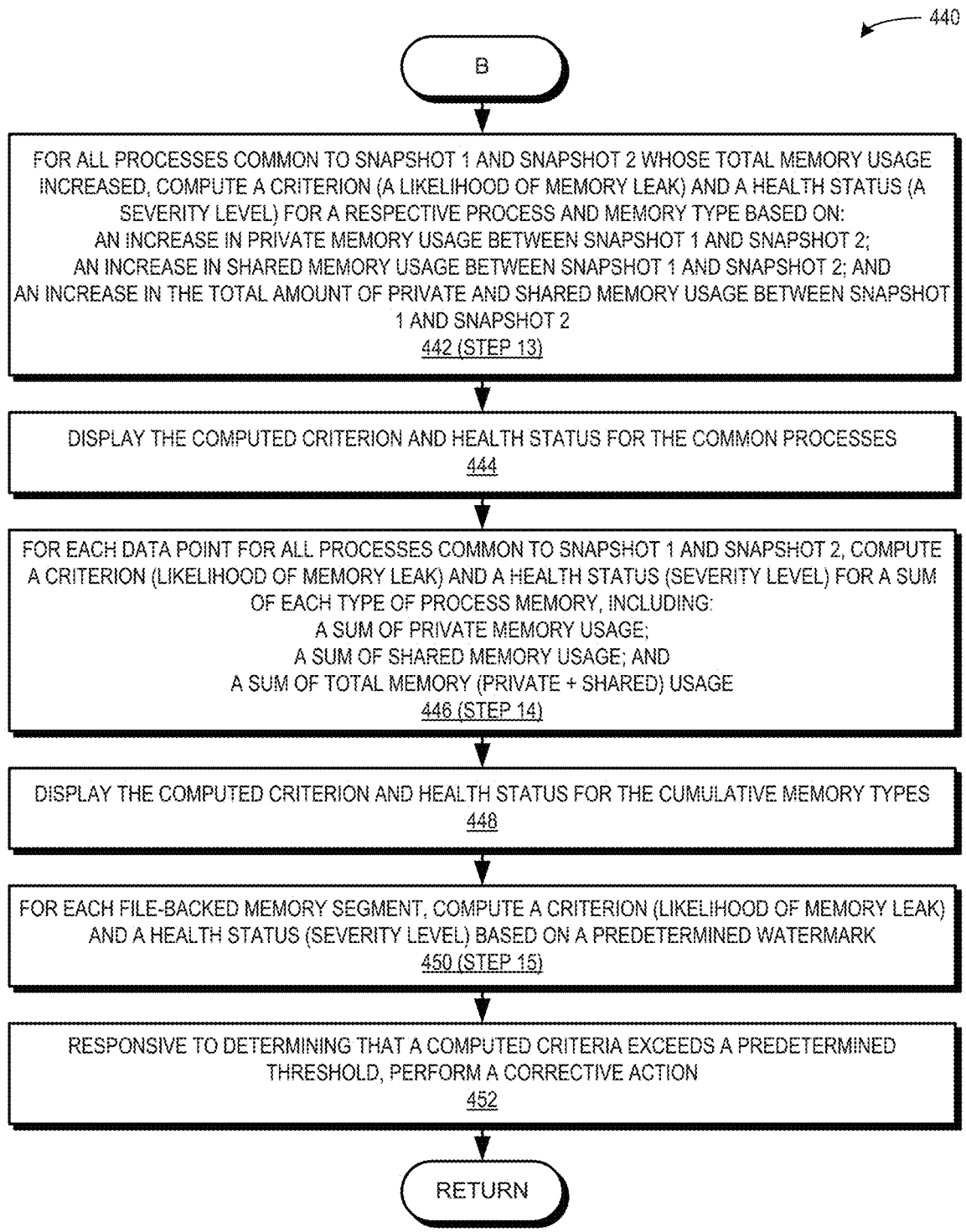
FIG. 4C presents a flowchart illustrating a method which facilitates predicting and mitigating memory leakage in a computer system, including Steps 13-15 as described herein, in accordance with an aspect of the present application.

FIG. 4C presents a flowchart 440 illustrating a method which facilitates predicting and mitigating memory leakage in a computer system, including Steps 13-15 as described herein, in accordance with an aspect of the present application. For all processes common to snapshot 1 and snapshot 2 whose total memory usage increased, the system computes a criterion (a likelihood of memory leak) and a health status (a severity level) for a respective process and memory type based on: an increase in private memory usage between snapshot 1 and snapshot 2; an increase in shared memory usage between snapshot 1 and snapshot 2; and an increase in the total amount of private and shared memory usage between snapshot 1 and snapshot 2 (Step 13, operation 442). The system displays the computed criterion and health status for the common process (operation 444, as in display element 174 of FIG. 1). For each data point for all processes common to snapshot 1 and snapshot 2, the system computes a criterion and a health status for a sum of each type of process memory, including: a sum of private memory usage; a sum of shared memory usage; and a sum of total memory (private+shared) usage (Step 14, operation 446). The system displays the computed criterion and health status for the cumulative memory types (operation 448, as in display element 176 of FIG. 1). For each file-backed memory segment, the system computes a criterion and a health status based on a predetermined watermark (Step 15, operation 450). Responsive to determining that a computed criteria (e.g., from 442, 446, or 450) exceeds a predetermined threshold, the system (or an administrative user) performs a corrective action (operation 452), and the operation returns.

Displayed Results of Various Steps of Method; Computing Criterion; Examples of Computing Criterion FIG. 5A presents results 500 of Steps 1-8 of the described method, in accordance with an aspect of the present application. As shown in results 500, Step 8 provides a "sanity check" on the comparative accounting of Steps 1-7, and verifies that the changes in memory between snapshot 1 and snapshot 2 are completely accounted for, with no errors. The terms "kilobytes," "KB," and "KiB" are used interchangeably in this disclosure and the accompanying Figures.

FIG. 5B presents results 520 of Step 11 of the described method, including a list of processes with an increase in total memory usage, in accordance with an aspect of the present application. Results 520 can include a list of processes and, for each process, information including: the process name; an amount of PSS shared memory usage between snapshot 1 and snapshot 2; an amount of heap memory usage between snapshot 1 and snapshot 2; an amount of private memory usage between snapshot 1 and snapshot 2; an amount of shared memory usage between snapshot 1 and snapshot 2; a total amount of memory (private+shared) used between snapshot 1 and snapshot 2; and a percentage of total memory used by the process. For example, an entry 522 for the process named "httpd" indicates the following information by memory usage type between snapshot 1 and snapshot 2: 0.0 KB of PSS shared memory usage; 7780.0 KB of heap memory usage; 13060.0 KB of private memory usage; 8.0 KB of shared memory usage; 13068.0 KB of total amount of memory usage (private+shared); and 86.29% of total memory used by the process. Results 520 are displayed in a descending order of total memory usage increase (13068.0 to 1.0). In some aspects, results 520 can be displayed based on an ascending or descending order for data in any column depicted in results 520.

FIG. 5C presents results 540 of Step 13 of the described method, including a list of processes with an increase in total memory usage and a computed criterion and health status, in accordance with an aspect of the present application. Results 540 can include a list of processes and, for each process, information including: the process name; an amount of PSS shared memory usage between snapshot 1 and snapshot 2; an amount of heap memory usage between snapshot 1 and snapshot 2; an amount of private memory usage between snapshot 1 and snapshot 2; an amount of shared memory usage between snapshot 1 and snapshot 2; a criterion which indicates a likelihood of memory leak for the process and which is calculated for the process using, e.g., a least squares linear fit based on data points between snapshot 1 and snapshot 2 (as described below in relation to FIG. 6); and a health status or a health condition which indicates as severity level.

The criterion can be based on a predetermined number of units of time for system requirements, e.g., hours or days, and the health condition can be based on a plurality of predefined ranges which are based on the predetermined number of units of time. For example, a typical maintenance contract for a computing system may require a firmware upgrade every two years, and during each two-year operational time, the computing system may be expected to run continuously for that two-year time period. Thus, the network administrator or other administrative user can set as the "Critical" range for a health condition any criterion which is less than the predetermined threshold of two years, which means that a criterion computation for a process which yields a "time to exhaust memory" or a "time to fill memory" of less than 2 years can be flagged as "Critical." The system can calculate the criterion as the time to fill the memory based on current memory usage, total memory capacity, and a memory safety threshold, as well as the calculated rate of memory leakage in kilobytes per hour for a given process, as described below. Once the criterion is calculated, the system can compare the criterion against the predetermined threshold (or thresholds), and determine which predefined category range applies for the calculated criteria. For example: a criterion of less than 2 years may be associated with a "Critical" health condition; a criterion of between 2 years and 5 years may be associated with a "Warning" health condition; and a criterion of greater than 5 years may be associated with an "Ok" health condition. A greater or lesser number of ranges and associated categories may be used and configured by the system or the administrative user. In addition, each health condition may be associated with an action which is to be performed automatically (e.g., restarting the process) or reported in a notification to the administrative user (e.g., which allows the administrative user to determine whether to perform a corrective action such as restarting the process).

As an example, an entry 542 for the process named "httpd" indicates the following information by memory usage type between snapshot 1 and snapshot 2: 0.0 KB of PSS shared memory usage; 7780.0 KB of heap memory usage; 13060.0 KB of private memory usage; 8.0 KB of shared memory usage; a criterion of 1.61 (e.g., in a time unit of years); and a corresponding health condition of "Critical." Results 540 are displayed in an ascending order of calculated criterion value (1.61 to 4042.60). In some aspects, results 540 can be displayed based on an ascending or descending order for data in any column depicted in results 540.

Recall that two types of general memory can include process memory and files in RAM-based file systems (e.g., tmpfs of Linux), and that the system can treat these two memory types as separate memory spaces even though both types may reside in the physical RAM memory. For RAM disk memory, the system can compute the likelihood of memory leak associated with a file-backed memory segment along with an associated health status based on a predetermined watermark. The watermark can be, e.g., a percentage ranging from 0% (completely empty) to 100% (completely full). The system can configure the watermark (i.e., the predetermined watermark) at some percentage below 100%, such that memory leaks may be caught and mitigated long before those memory leaks would cause the system to malfunction. This configurable watermark may be determined based on historical data, an industry standard, specific device-related information, and any other characteristic.

Figure 6:
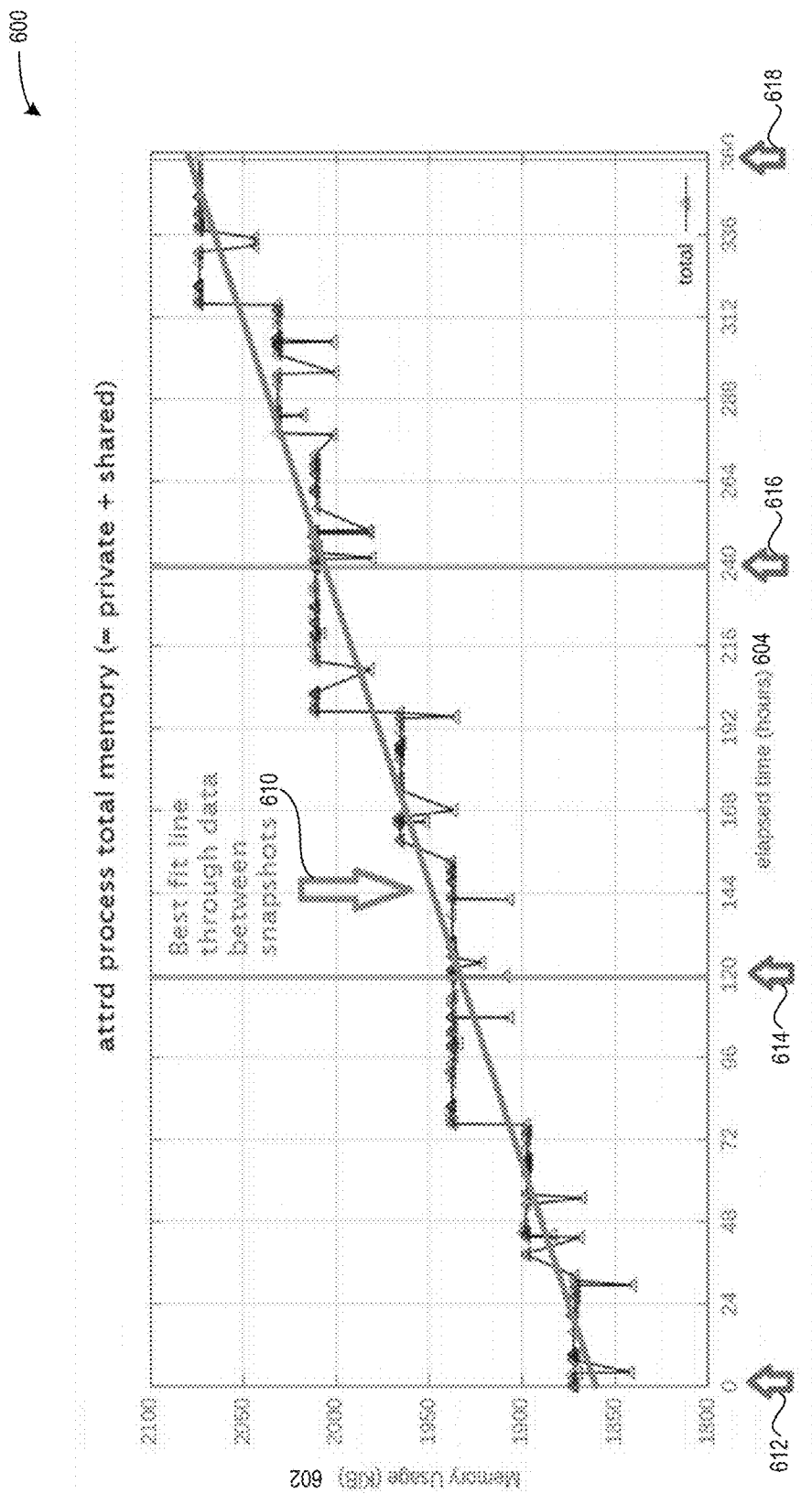
FIG. 6 presents a diagram depicting memory usage over time and computation of a criterion from data points in between two memory snapshots, in accordance with an aspect of the present application.

FIG. 6 presents a diagram 600 depicting memory usage over time and computation of a criterion from data points in between two memory snapshots, in accordance with an aspect of the present application. Diagram 600 includes an x-axis of elapsed time (in hours) 604 and a y-axis of memory usage (in KB) 602. Arrows 612, 614, 616, and 618 can indicate points in time at which accounting snapshots are taken. The data points in between each set of arrows can be used to compute the linear fit slope, criterion, and health. A line 610 can indicate the best fit line through data between snapshots.

In one example for computing the criterion for a Process A, assume the following: current memory usage by process A is 70,540 KB; the total available memory size is 1,021,740 KB; and the memory safety threshold is set at 250,000 KB. The memory safety threshold can represent or indicate an amount of buffer before the system will fill the memory.

Assume that Process A is determined to be leaking memory at a rate of 20 KB per hour, as determined from various snapshots and a calculated least squares linear fit (e.g., as shown in FIG. 6). The system can compute the criterion by calculating the "time to fill memory" as: (the total memory size minus the memory safety threshold minus the current memory usage by Process A) divided by the memory leakage rate: (1,021,740−250,000−70,540)/20=35,060.0 hours, which yields 35,060.0 hours/(24 hours/day× 365 days/year=8,760 hours/year)=4.0 years. The system can apply, e.g., the previously described threshold (as related to the two-year frequency of required firmware upgrades), with the ranges of: "Less than 2 years (Critical)"; "Between 2-5 years (Warning)"; and "Greater than 5 years (Ok)." Thus, the determined time to fill memory for Process A (i.e., the computed criterion of 4.0 years) falls in the range with the health status of "Warning," and no immediate corrective action needs to be taken. The system can log Process A in a list of processes which need to be watched, e.g., by obtaining snapshots more frequently or at shorter intervals. The system can perform other reporting or monitoring tasks related to determining the computed criterion for Process A as "Warning."

In another example for computing the criterion for a Process B, assume the following: current memory usage by process B is 70,540 KB; the total available memory size is 1,021,740 KB; and the memory safety threshold is set at 250,000 KB. Assume that Process B is determined to be leaking memory at a rate of 1,024 KB per hour, which is determined as described above. The system can compute the criterion by calculating the "time to fill memory" as: (the total memory size minus the memory safety threshold minutes the current memory usage by Process B) divided by the memory leakage rate: (1,021,740−250,000−70,540)/1,024=685 hours, which yields: 685 hours/(24×365=8,760) hours/year=0.078 years. The system can determine that Process B falls in the range with the health status of "Critical," because the determined time to fill memory for Process B (i.e., the computed criterion of 0.078 years) is less than 2 years, which corresponds to the range with the health status of "Critical." This indicates that immediate corrective action needs to be taken. The system can notify or alert an administrative user of the "Critical" health condition of Process B. The system and/or user can perform a corrective action such as killing Process B, or killing and restarting Process B. The system can also perform other logging or monitoring tasks related to determining the computed criterion for Process B as "Critical."

Computer System and Apparatus

Figure 7:
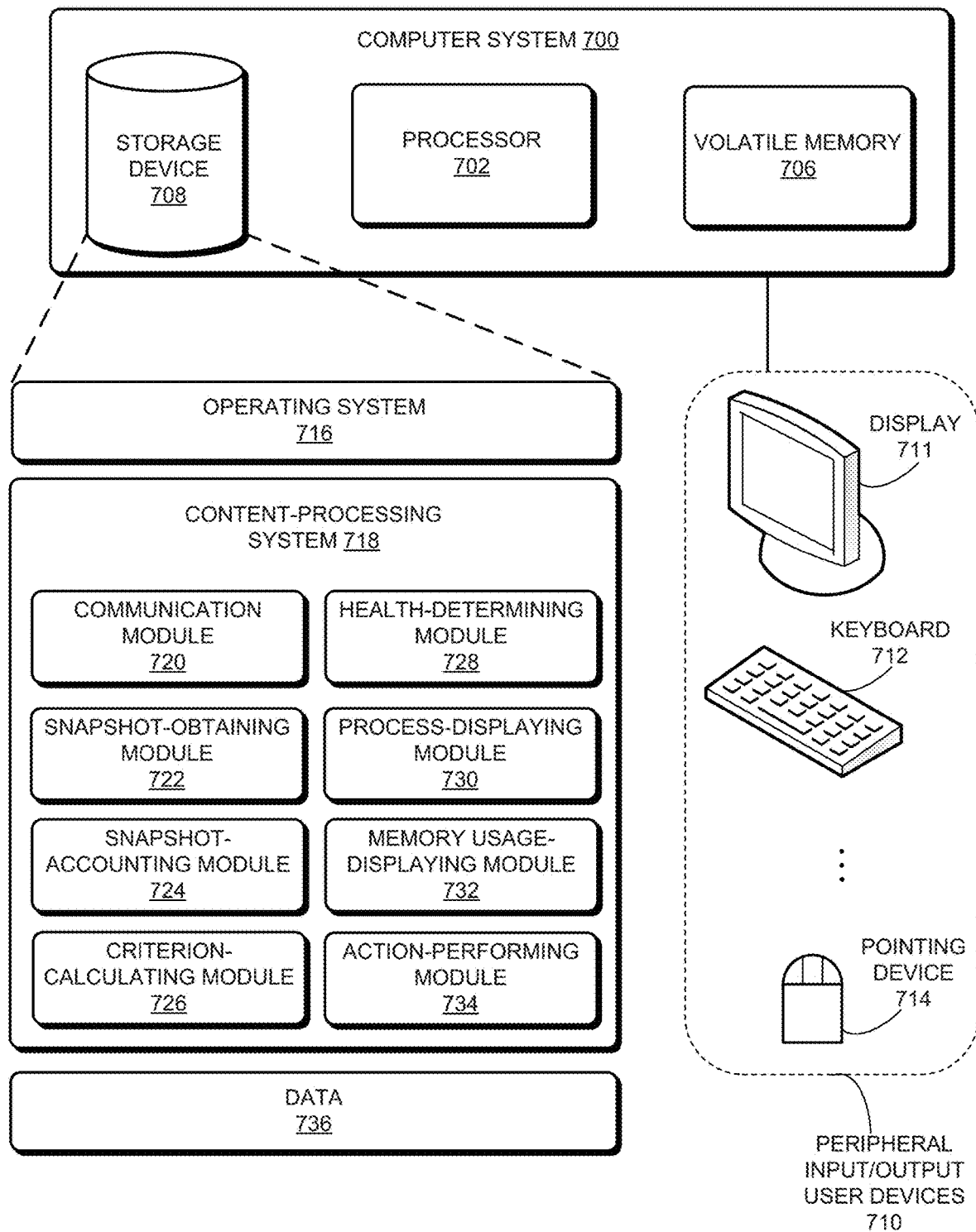
FIG. 7 illustrates a computer system which facilitates predicting and mitigating memory leakage in a computer system, in accordance with an aspect of the present application.

FIG. 7 illustrates a computer system 700 which facilitates predicting and mitigating memory leakage in a computer system, in accordance with an aspect of the present application. Computer system 700 includes a processor 702, a volatile memory 706, and a storage device 708. Volatile memory 706 can include, e.g., random access memory (RAM), that serves as a managed memory, and can be used to store one or more memory pools. Storage device 708 can include persistent storage which can be managed or accessed via processor 702. Furthermore, computer system 700 can be coupled to peripheral input/output (I/O) user devices 710, e.g., a display device 711, a keyboard 712, and a pointing device 714. Storage device 708 can store an operating system 716, a content-processing system 718, and data 736.

Content-processing system 718 can include instructions, which when executed by computer system 700, can cause computer system 700 or processor 702 to perform methods and/or processes described in this disclosure. Specifically, content-processing system 718 can include instructions for receiving and transmitting data packets, requests, and commands (communication module 720).

Content-processing system 718 can further include instructions for determining a first snapshot and a second snapshot of memory usage by processes in a computing system based on a predetermined time interval, wherein a respective snapshot indicates, for a respective process, memory usage corresponding to memory types including private memory and shared memory (snapshot-obtaining module 722). Content-processing system 718 can include instructions for computing, for processes common to the first and the second snapshots, a likelihood of memory leak for a process and memory type based on: an increase in an amount of heap memory, private memory, shared memory, and a total amount of private and shared memory used by the process (criterion-calculating module 726). Content-processing system 718 can include instructions for comparing the computed likelihood for the process with a predetermined threshold (health-determining module 728). Content-processing system 718 can include instructions for, responsive to determining that the computed likelihood for the process exceeds the predetermined threshold (health-determining module 728), performing a corrective action to address memory leak associated with the process (action-performing module 734).

Content-processing system 718 can include instructions for verifying that all changes in memory usage between the first and the second snapshots are accounted for, as described in relation to Steps 1-8 in FIGS. 4A, 4B, and 5A (snapshot-accounting module 724). Content-processing system 718 can include instructions for displaying, for the process of the common processes, information which includes: an increase or a decrease in the amount of proportional set size (PSS) shared memory used by the process; the increase or a decrease in the amount of heap memory used by the process; the increase or a decrease in the amount of private memory used by the process; the increase or a decrease in the amount of shared memory used by the process; and the increase in the total amount of private and shared memory used by the process (process-displaying module 730), as well as displaying the computed likelihood and an associated health status for each process (memory usage-displaying module 732), as described in relation to Steps 11-14 in FIGS. 4B, 4C, 5B, and 5C.

Data 736 can include any data that is required as input or generated as output by the methods and/or processes described in this disclosure. Specifically, data 736 can store at least: two or more snapshots; a type of memory usage; an amount of a certain type of memory usage, including heap memory, private memory, shared memory, PSS shared memory, and total memory; a process; a list of processes; an increase or a decrease in an amount of memory usage; a likelihood or criterion; a health status; a health condition; a severity level; a predetermined threshold; a corrective action; an indicator of whether changes in memory usage between two snapshots is successfully verified; a computation; a sum; an ascending or descending order; a set of processes; a data point; a time; an elapsed time; a predetermined time interval; a criteria or criterion; a predetermined number of units of time; a number; a comparison; a predefined range based on a unit of time; a least squares linear fit method; an indicator of a process, set of processes, a system comprising processes, and a file-backed memory segment; and a predetermined watermark.

Figure 8:
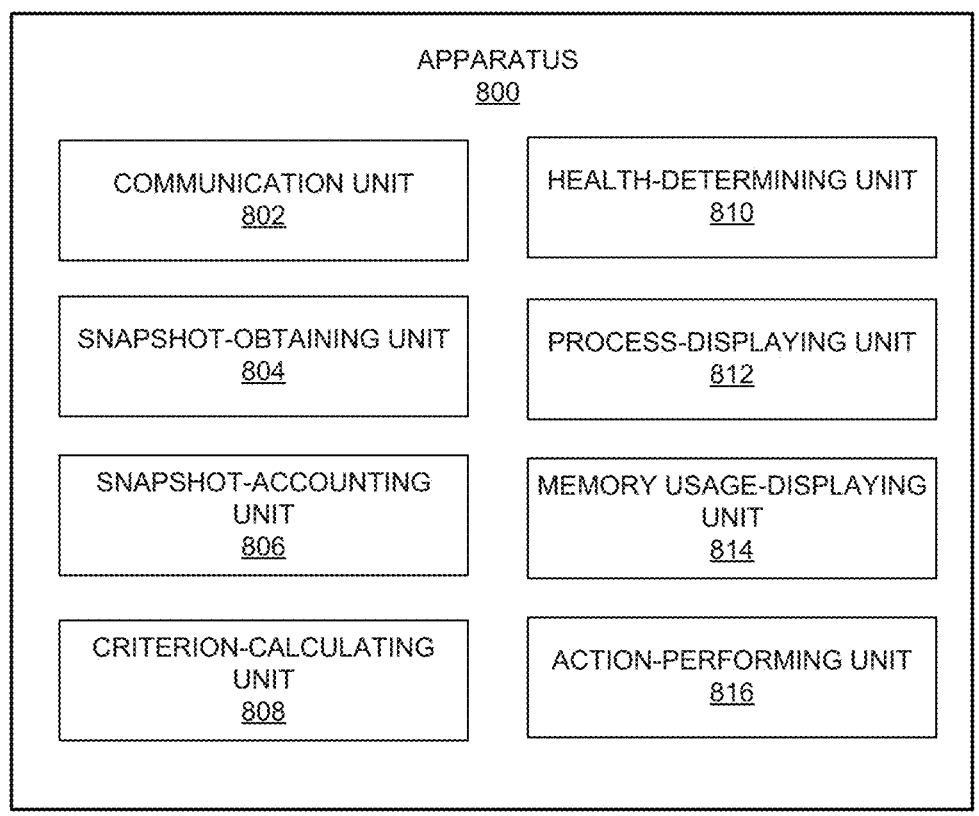
FIG. 8 illustrates an apparatus which facilitates predicting and mitigating memory leakage in a computer system, in accordance with an aspect of the present application.

FIG. 8 illustrates an apparatus 800 which facilitates predicting and mitigating memory leakage in a computer system, in accordance with an aspect of the present application. Apparatus 800 can comprise a plurality of units or apparatuses which may communicate with one another via a wired, wireless, quantum light, or electrical communication channel. Apparatus 800 may be realized using one or more integrated circuits, and may include fewer or more units or apparatuses than those shown in FIG. 8. Furthermore, apparatus 800 may be integrated in a computer system, or realized as a separate device or devices capable of communicating with other computer systems and/or devices.

Apparatus 800 may also include a non-volatile storage system or a memory management unit. Apparatus 800 can comprise modules or units 802-816 which are configured to perform functions or operations similar to modules 720-734 of computer system 700 of FIG. 7, including: a communication unit 802; a snapshot-obtaining unit 804; a snapshot-accounting unit 806; a criterion-calculating unit 808; a health-determining unit 810; a process-displaying unit 812; a memory usage-displaying unit 814; and an action-performing unit 816.

In general, the disclosed aspects provide a system which facilitates predicting and mitigating memory leakage in a computer system. In one aspect, during operation, the system determines a first snapshot and a second snapshot of memory usage by processes in a computing system based on a predetermined time interval, wherein a respective snapshot indicates, for a respective process, memory usage corresponding to memory types including private memory and shared memory. The system computes, for processes common to the first and the second snapshots, a likelihood of memory leak for a process and memory type based on: an increase in an amount of heap memory and private memory used by the process; an increase in an amount of shared memory used by the process; and an increase in a total amount of private and shared memory used by the process. The system compares the computed likelihood for the process with a predetermined threshold. Responsive to determining that the computed likelihood for the process exceeds the predetermined threshold, the system (or a user) performs a corrective action to address memory leak associated with the process.

In a variation on this aspect, the system verifies that all changes in memory usage between the first and the second snapshots are accounted for, by: performing a first set of computations, which comprises: determining an increase or a decrease in private memory for the common processes; determining an increase or a decrease in heap memory for the common processes; determining an increase or a decrease in a proportional set size (PSS) shared memory for the common processes; summing increases in shared memory for the common processes; and summing decreases in shared memory for the common processes. The system computes, based on the first set of computations, a net change in a total memory usage for the first snapshot. The system verifies that the computed net change for the first snapshot matches a total memory usage of the second snapshot.

In another variation on this aspect, the system displays, for the common processes, information which includes: an increase or a decrease in an amount of proportional set size (PSS) shared memory used by the process; the increase or a decrease in the amount of heap memory used by the process; the increase or a decrease in the amount of private memory used by the process; the increase or a decrease in the amount of shared memory used by the process; and the increase in the total amount of private and shared memory used by the process.

In a further variation, the information is displayed based on at least one of: a descending order based on the increase in the total amount of private and shared memory used by the process; and an ascending order based on the decrease in the total amount of private and shared memory used by the process.

In a further variation, the descending order is used to display a first set of the common processes with an increase in the total amount of private and shared memory used by each process, and the ascending order is used to display a second set of the common processes with a decrease in the total amount of private and shared memory used by each process.

In a further variation, the information displayed further includes the computed likelihood and an associated health status for at least one of: a process with an increase in the amount of private memory used by the process; a process with an increase in the amount of shared memory used by the process; a process with an increase in the total amount of private and shared memory used by the process; a sum of private memory usage for data points in each process; a sum of shared memory usage for data points in each process; and a sum of total memory usage, which includes the private memory usage and the shared memory usage, for data points in each process.

In a further variation, the likelihood comprises a criteria which is based on a predetermined number of units of time, and the associated health status is based on the comparison of the computed likelihood for the process with the predetermined threshold and comprises a plurality of predefined ranges based on the predetermined number of units of time.

In a further variation, the information displayed further includes the computed likelihood and the associated health status for a system associated with at least one of: the first and the second snapshots; and the common processes.

In a further variation, computing the likelihood comprises calculating a least squares linear fit based on the increase in the amounts of heap memory, private memory, shared memory, and total private and shared memory used by the process.

In a further variation, the system computes the likelihood of memory leak associated with a file-backed memory segment and an associated health status based on a predetermined watermark.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware devices or apparatus. For example, the hardware devices or apparatus can include, but are not limited to, application-specific integrated circuit (ASIC) chips, field-programmable gate arrays (FPGAs), dedicated or shared processors that execute a particular software program or a piece of code at a particular time, and other programmable-logic devices now known or later developed. When the hardware devices or apparatus are activated, the hardware modules perform the methods and processes included within them.

The foregoing descriptions of aspects have been presented for purposes of illustration and description only. They are not intended to be exhaustive or to limit the aspects described herein to the forms disclosed. Accordingly, many modifications and variations will be apparent to practitioners skilled in the art. Additionally, the above disclosure is not intended to limit the aspects described herein. The scope of the aspects described herein is defined by the appended claims.

What is claimed is:

1. A computer-implemented method, comprising:
    determining a first snapshot and a second snapshot of memory usage by processes in a computing system based on a predetermined time interval, wherein a respective snapshot of the first snapshot and the second snapshot indicates, for a respective process, memory usage corresponding to memory types including a private memory and a shared memory;
    computing, for processes common to the first snapshot and the second snapshot, a likelihood of a memory leak for a process and a memory type, the computing of the likelihood comprising calculating a least squares linear fit based on:
        an increase in an amount of a heap memory and a private memory used by the process,
        an increase in an amount of a shared memory used by the process, and
        an increase in a total amount of the private memory and the shared memory used by the process;
    comparing the computed likelihood for the process with a predetermined threshold; and
    responsive to determining that the computed likelihood for the process exceeds the predetermined threshold, performing, in the computing system, a corrective action to address the memory leak for the process.

2. The method of claim 1, further comprising verifying that all changes in memory usage between the first snapshot and the second snapshot are accounted for, by:
    performing a set of computations, the set of computations comprising:
        determining an increase or a decrease in a private memory for the common processes,
        determining an increase or a decrease in a heap memory for the common processes,
        determining an increase or a decrease in a proportional set size (PSS) shared memory for the common processes,
        summing increases in a shared memory for the common processes, and
        summing decreases in the shared memory for the common processes;
    computing, based on the set of computations, a net change in a total memory usage for the first snapshot; and
    verifying that the computed net change for the first snapshot matches a total memory usage of the second snapshot.

3. The method of claim 1, further comprising:
    displaying information comprising:
        an increase or a decrease in an amount of a proportional set size (PSS) shared memory used by the process;
        the increase or a decrease in the amount of the heap memory used by the process;
        the increase or a decrease in the amount of the private memory used by the process;
        the increase or a decrease in the amount of the shared memory used by the process; and
        the increase in the total amount of the private memory and the shared memory used by the process.

4. The method of claim 3, wherein the information is displayed based on at least one of:

a descending order based on the increase in the total amount of the private memory and the shared memory used by the process, or an ascending order based on the decrease in the total amount of the private memory and the shared memory used by the process.

5. The method of claim 4,
wherein the descending order is used to display a first set of the common processes with an increase in a total amount of a private memory and a shared memory used by each process of the common processes, and
wherein the ascending order is used to display a second set of the common processes with a decrease in a total amount of the private memory and the shared memory used by each process of the common processes.

6. The method of claim 3, wherein the information displayed further includes the computed likelihood and an associated health status for the process.

7. The method of claim 1, further comprising:
determining an associated health status for the process based on the comparison of the computed likelihood for the process with the predetermined threshold.

8. The method of claim 1, wherein the computed likelihood of the memory leak for the process and the memory type is based on a time to fill a memory of the memory type.

9. The method of claim 8, wherein the time to fill the memory of the memory type is based on a current memory usage of the memory of the memory type, a total memory capacity of the memory of the memory type, and a memory safety threshold for the memory of the memory type.

10. The method of claim 1, further comprising:
computing a likelihood of a memory leak associated with a file-backed memory segment and an associated health status based on a predetermined watermark.

11. A computer system, comprising:
a processor; and
a non-transitory storage medium coupled to the processor and storing instructions which, when executed on the processor, cause the computer system to:
determine a first snapshot and a second snapshot of memory usage by processes in the computer system based on a predetermined time interval, wherein a respective snapshot of the first snapshot and the second snapshot indicates, for a respective process, memory usage corresponding to memory types including a private memory and a shared memory;
compute, for processes common to the first snapshot and the second snapshot, a likelihood of a memory leak for a process and a memory type based on:
an increase in an amount of a heap memory used by the process,
an increase in an amount of a private memory used by the process, wherein the private memory used by the process comprises the heap memory and a memory-mapped file input/output memory,
an increase in an amount of a shared memory used by the process, and
an increase in a total amount of the private memory and the shared memory used by the process;
compare the computed likelihood for the process with a predetermined threshold; and
responsive to determining that the computed likelihood for the process exceeds the predetermined threshold, initiate a corrective action to address a memory leak for the process.

12. The computer system of claim 11, wherein the instructions when executed cause the computer system to verify that all changes in memory usage between the first snapshot and the second snapshot are accounted for, by:
performing a set of computations, the set of computations comprising:
determining an increase or a decrease in a private memory for the common processes;
determining an increase or a decrease in a heap memory for the common processes;
determining an increase or a decrease in a proportional set size (PSS) shared memory for the common processes;
summing increases in a shared memory for the common processes; and
summing decreases in the shared memory for the common processes;
computing, based on the set of computations, a net change in a total memory usage for the first snapshot; and
verifying that the computed net change for the first snapshot matches a total memory usage of the second snapshot.

13. The computer system of claim 11, wherein the instructions when executed cause the computer system to:
display information comprising:
an increase or a decrease in an amount of a proportional set size (PSS) shared memory used by the process;
the increase or a decrease in the amount of the heap memory used by the process;
the increase or a decrease in the amount of the private memory used by the process;
the increase or a decrease in the amount of the shared memory used by the process; and
the increase in the total amount of the private memory and the shared memory used by the process.

14. The computer system of claim 13, wherein the information displayed further includes the computed likelihood and an associated health status for the process.

15. The computer system of claim 11, wherein the instructions when executed cause the computer system to:
determine an associated health status for the process based on the comparison of the computed likelihood for the process with the predetermined threshold.

16. The computer system of claim 11, wherein the computed likelihood of the memory leak for the process and the memory type is based on a time to fill a memory of the memory type.

17. The computer system of claim 11, wherein computing the likelihood comprises calculating a least squares linear fit based on the increase in the amount of the heap memory used by the process, the increase in the amount of the private memory used by the process, the increase in the amount of the shared memory used by the process, and the increase in the total amount of the private memory and the shared memory used by the process.

18. A non-transitory computer-readable storage medium storing instructions that when executed by a computer cause the computer to:
determine a first snapshot and a second snapshot of memory usage by processes in a computing system based on a predetermined time interval, wherein a respective snapshot of the first snapshot and the second snapshot indicates, for a respective process, memory usage corresponding to memory types including a private memory and a shared memory;
compute, for processes common to the first snapshot and the second snapshot, a likelihood of a memory leak for a process and a memory type based on:

an increase in an amount of a heap memory and a private memory used by the process, an increase in an amount of a shared memory used by the process, and an increase in a total amount of the private memory and the shared memory used by the process;

compare the computed likelihood for the process with a predetermined threshold;

responsive to determining that the computed likelihood for the process exceeds the predetermined threshold, initiate a corrective action to address a memory leak associated with the process; and cause display, for the common processes, information comprising:

an increase or a decrease in an amount of a proportional set size (PSS) shared memory used by the process, the increase or a decrease in the amount of the heap memory used by the process, the increase or a decrease in the amount of the private memory used by the process, the increase or a decrease in the amount of the shared memory used by the process, and the increase in the total amount of the private memory and the shared memory used by the process.

19. The non-transitory computer-readable storage medium of claim 18, wherein the computed likelihood of the memory leak for the process and the memory type is based on a time to fill a memory of the memory type.

20. The non-transitory computer-readable storage medium of claim 19, wherein the time to fill the memory of the memory type is based on a current memory usage of the memory of the memory type, a total memory capacity of the memory of the memory type, and a memory safety threshold for the memory of the memory type.

* * * * *